March 16, 1971 — R. M. ROOD — 3,570,037
SHAFT WIPER

Filed Aug. 21, 1968 — 2 Sheets-Sheet 1

INVENTOR
ROBERT M. ROOD
BY Charles A. Johnson
ATTORNEY

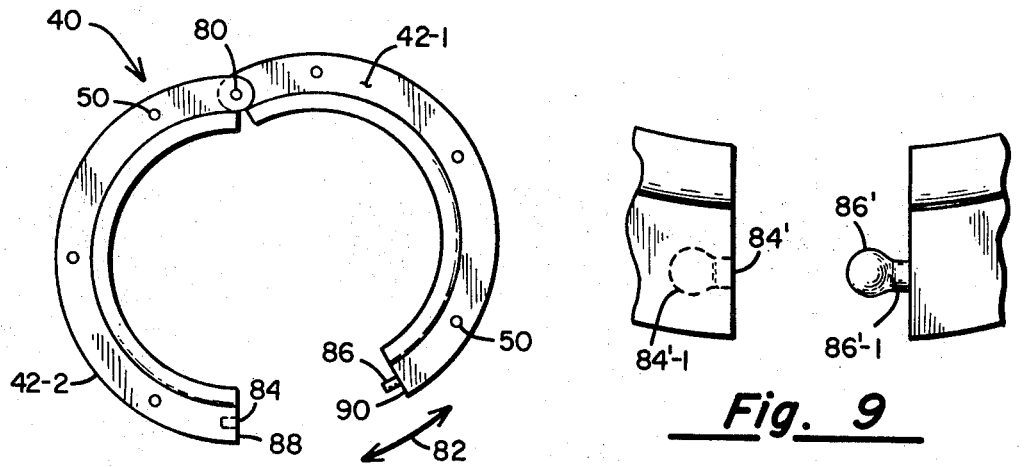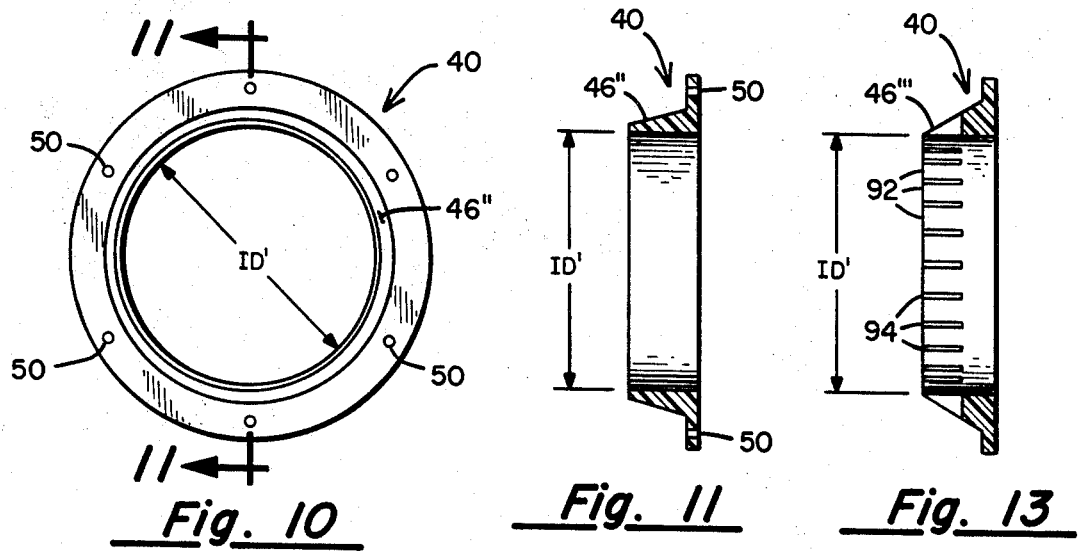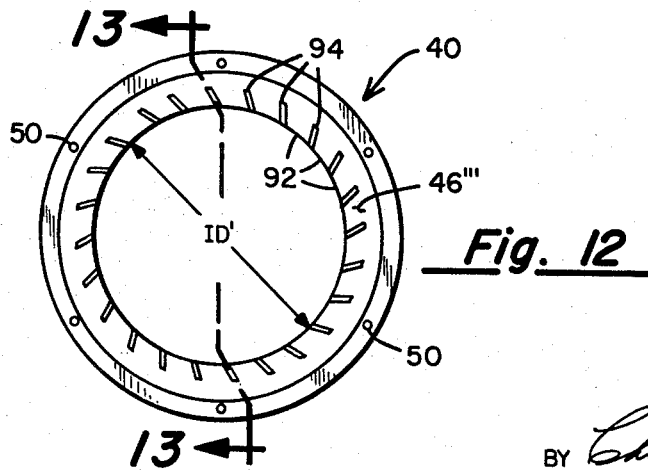

United States Patent Office 3,570,037
Patented Mar. 16, 1971

3,570,037
SHAFT WIPER
Robert M. Rood, 3225 Victoria Road,
St. Paul, Minn. 55119
Filed Aug. 21, 1968, Ser. No. 754,248
Int. Cl. F16c 33/20
U.S. Cl. 15—210
3 Claims

ABSTRACT OF THE DISCLOSURE

A wiper for use with a movable shaft, or quill, is adapted for axial movement within a supporting structure. The shaft wiper slideably surrounds and engages the movable shaft in a manner to wipe all contaminants and foreign particles therefrom for preventing the contaminants or particles from becoming lodged between the movable shaft and the mounting, thereby preventing the movable shaft from becoming lodged in the housing and unable to be moved. A circular structure having means for holding at least a portion of the wiper in contact with the movable shaft is shown. Various other embodiments of the shaft wiper are also shown.

BACKGROUND OF THE INVENTION (1) Field of the invention

This invention relates generally to a shaft wiper for use with various types of power-driven tools, such as drill presses, milling machines, injection molding machines, and the like. More specifically, it relates to a wiper for use with a moveable shaft having a sliding fit in a supporting housing for preventing the shaft from becoming lodged in an associated housing as a result of particles or contaminants becoming lodged between the housing and the shaft.

(2) Description of the prior art

It is well known that modern-day power machines commonly utilized in machine shops operate under power at high speeds. In the most up-to-date machine shop arrangements, many of the machines are operated automatically by numerical-control devices without an operator being constantly present. It has been found to be a common problem among the prior art power-driven tools and devices having a moveable shaft operating within a supporting housing, that various kinds of particles and contaminants become attached or adhere to the moveable shaft and are drawn into the supporting housing, thereby causing the housing to provide a pressure on the shaft causing it to become lodged and the machine to become unuseable until attended to by a repairman. The repair often requires disassembling a large portion of the machine and results in a considerable down-time for the jammed machine. This down-time causes the loss of the use of the machine, thereby decreasing its potential output, and additionally requires the expense of a repairman. It is common practice among operators, utilizing such devices as power-driven drill presses and milling machines, to utilize an air jet to remove the particles as they are drilled or milled from a workpiece. Often the air jet is of a substantially high pressure. When the air jet is directed at the workpiece, it often occurs that the particles are sprayed outward and upward. Many of the particles so moved by the air stream are caused to be swirled around the moveable shaft alternatively referred to as a quill. Since the quill has a sliding fit in the supporting housing, it is common for the quill to have a lubricant thereon for providing ease of movement within the housing. The lubricant tends to collect and gather the small particles and contaminants. When the operator then causes the drill or the milling-cutter to be withdrawn from the workpiece, the contaminants are carried on the quill into the housing. If a substantial-size particle is held on the quill, it can and does result in the quill being lodged in the housing. Most skilled operators are aware of this problem and attempt to direct the air stream for removing the particles in such a manner that the particles are not directed upward toward the housing, but even the most skilled operator cannot completely eliminate this problem. The problem is even further accentuated in those numerical control devices where the operator is not continually present and the machine is caused to operate automatically by a numerical-control device.

To date, no effective means has been developed for preventing such lodging of the quill in the housing.

SUMMARY

The shaft wiper of the present invention overcomes the problem of quill jamming and provides marked advantages for the operation of power driven machines having a quill moveable in a supporting housing. The shaft wiper of this invention comprises a molded unit for surrounding and slideably engaging a moveable quill. The shaft wiper is so constructed that it locks the opening between the quill and the housing. In one configuration, a spring device is used for biasing a portion of the shaft wiper tightly, but slideably, against the quill, thereby stripping away any particles or contaminants that may adhere to the surface of the quill as the quill is moved upward in the supporting housing. In other configurations, the shaft wiper is of such a design that there is a substantial interference fit between a portion of the shaft wiper and the moveable quill. The function and operation is substantially the same for all of the configurations shown, that is, to prevent any particles or contaminants from becoming imbedded between the quill and the housing, and thereby preventing jamming of the tool. Such shaft wipers attend themselves to the problems of the prior art, and overcome such operational jamming problems. Finally, the device is of a unitary structure and can be molded, thereby providing an extremely inexpensive manufacturing process for a device that prevents extremely expensive down-time and repair costs for machine tools.

In view of the foregoing, it is a primary object of this invention to provide a shaft wiper device for use with machine tools having a moveable quill supported in a housing. Yet another object of this invention is to provide a shaft wiper that is of a unitary structure that does not require expensive manufacturing processes and can readily be molded from plastic materials. Still a further object of this invention is to provide a shaft wiper that can be utilized with a plurality of types of machine tools.

BRIEF DESCRIPTION OF THE DRAWINGS

The foregoing and other more detailed and specific objectives will be disclosed in the course of the following specification, with reference being made to the accompanying drawings in which: FIG. 8 illustrates a split shaft wiper for ease of mounting; FIG. 9 illustrates an alternative method of joining the split shaft wiper; FIG. 10 illustrates a bottom view of a shaft wiper adapted for having a substantial interference fit with an associated quill; FIG. 11 is a view of the shaft wiper of FIG. 10 taken along line 11—11; FIG. 12 is yet another embodiment of a shaft wiper having a substantial interference fit with an associated quill; and FIG. 13 is a view taken along line 13—13 in FIG. 12.

DESCRIPTION OF THE PREFERRED EMBODIMENT

Figure 1:
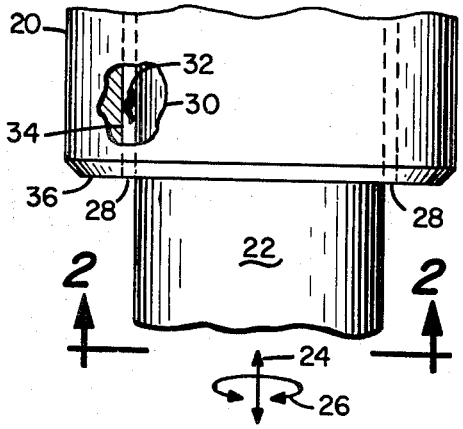
FIG. 1 illustrates a quill supported in a mounting housing having a particle lodged therebetween causing the quill to be jammed.

FIG. 1 illustrates the portion of a machine tool wherein a housing 20 supports a moveable quill 22. As illustrated by arrows 24 and 26 it can be seen that the quill is moveable in a longitudinal manner and may be rotatable about its longitudinal axis, as shown by the arrows respectively. Of course not all tools use a rotatable quill. There is illustrated also that there is a small spacing 28 around the quill 22 for providing a sliding fit between the housing 20 and the quill 22. A broken-away portion 30 illustrates a particle 32 lodged between the inner surface 34 of the housing 20 and the outer surface of the quill 22. Such a particle 32 can be relatively small and still be of sufficient size to cause the quill 22 to be jammed such that there can be neither longitudinal nor rotational movement thereof. When such a condition occurs, the tool must be stopped and disassembled to the extent of removing particle 32 so that the quill 22 can be readily moved.

Figure 2:
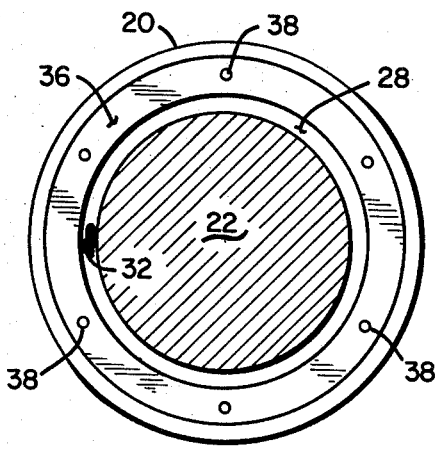
FIG. 2 is a view taken along lines 2—2 in FIG. 1.

FIG. 2 is a view taken along line 2—2 in FIG. 1 and clearly illustrates the sliding-fit spacing 28 between the quill 22 and the housing 20. It can be seen that there is a surface 36 at the lower end of housing 20. This surface 36 provides a means for mounting a shaft wiper of this invention. It is necessary merely to drill and tap screw-mounting holes 38 for mounting the shaft wiper that will be described below.

Figure 3:
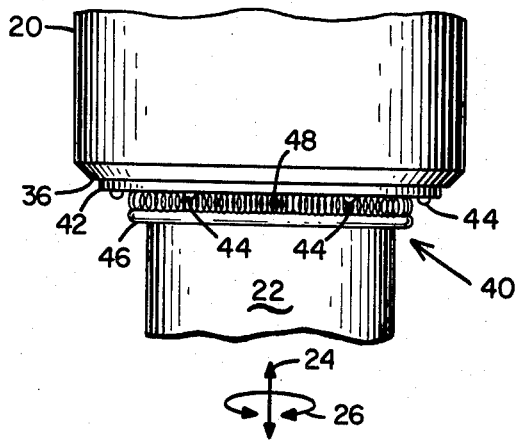
FIG. 3 illustrates the portion of the mounting and the quill of FIG. 1 but with a shaft wiper of the subject invention mounted in place.

Turning now to a consideration of FIG. 3, there is shown a housing 20 and having quill 22 mounted therein. Mounted on surface 36 there is shown a shaft wiper, referred to generally as 40. The wiper 40 has a mounting flange 42, through which mounting screws 44 extend into the mounting holes 38. Integrally formed with the mounting flange 42 is the wiper ring 46. The wiper ring 46 surrounds and is in slideable contact with the surface of quill 22. In order to hold a uniform tension on wiper ring 46, a biasing spring 48 completely circles the wiper ring 46 and holds it tightly against quill 22. Of course some other bias device could be used in place of spring 48. It should be noted, that it is normal for the surface of quill 22 to have oil or other lubricant material on the surface thereof. The presence of such lubricants and the fact that the wiper 40 is made of a plastic material results in little or no friction wear of the wiper ring portion 46.

Figures 4, 5:
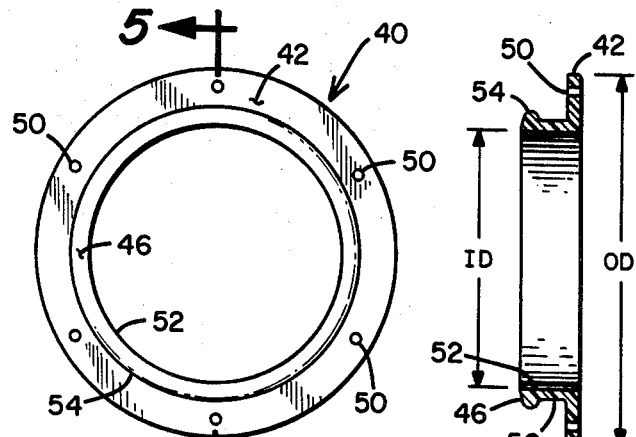
FIG. 4 is a view of one embodiment of the shaft wiper of this invention.
FIG. 5 is a view taken along line 5—5 in FIG. 4.

FIG. 4 is a plan view of the shaft wiper 40 illustrated in FIG. 3. It can be seen that mounting flange 42 has mounting holes 50 for receiving mounting screws 44. The inner surface 52 of the wiper ring 46 is made to cooperate with the outer surface of quill 22. The wiper ring 46 slants upward to a lip 54, which operates to cooperate with the spring 48, for retaining the spring in place. The slanted surface carries the particles away from the surface of the quill.

FIG. 5 is a sectional view taken along line 5—5 in FIG. 4, and parts previously discussed will bear the same reference numerals. This view illustrates that there is a channel 56 formed between the surface of mounting flange 42 and the wiper ring 46. Channel 56 operates to retain spring 48. For this configuration, the outside diameter OD is a size to be accommodated by surface 20 at the bottom of support 20. The inside diameter ID is slightly larger than the outside diameter of the quill 22. With such an arrangement, the operation of spring member 48 causes the wiper ring 46 to be pulled down to a slideable contact with quill 22. When in slideable contact, the wiper ring 46 operates to strip away any contaminants or undesired particles that may become lodged in opening 28 and carry them outward along the slanted surface.

Figure 6:
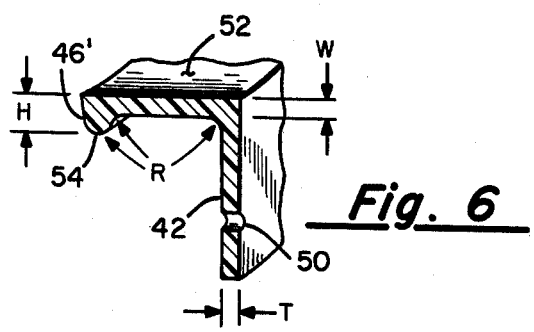
FIG. 6 is a section view of a portion of the shaft wiper illustrated in FIG. 5.

FIG. 6 is a sectional view of the shaft wiper 40 shown in FIG. 4, and illustrates the various design features of the shaft wiper. In order to appreciate the relative sizes of the members already described, a characteristic shaft wiper will be defined. For use with one type of drill press presently in use, a wiper ring 40 having an outside diameter of 3.950 inches, with an inside diameter of 3.375 inches can be used. In such a configuration, the thickness T of mounting flange 42 has been made ⅟₁₆ inch. The width W of the wiper ring 46 has been made 0.05 inch. The height H of the leading portion of the wiper ring 46 has been made 0.07 inch. It will be noted that the leading edge 46' is sloped such that any contaminants wiped from the quill 22 will tend to slide outwardly away from the surface rather than to build up immediately adjacent to surface. The radii R illustrated have been made 0.031 inch. These dimensions have been found to be advantageous for the type of shaft wiper 40 that is constructed of a molded plastic. It should be understood, of course, that the dimensions can vary depending upon the physical dimension of the housing and the quill to be wiped, and upon the exact type of plastic material or other material that may be used to construct the shaft wiper.

Figure 7:
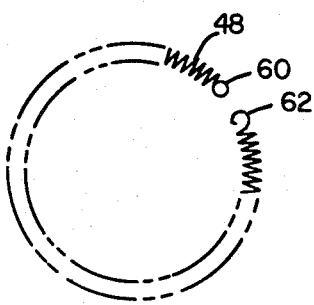
FIG. 7 illustrates the spring biasing means used with the shaft wiper shown in FIG. 4.

FIG. 7 illustrates the retaining spring 48 and indicates that it may have a loop 60 at one end for cooperating with a hook 62 at the other end. This loop and hook arrangement provides for ease of mounting the spring 48 in the retaining slot 56. Of course spring 48 can be made completely circular and merely expanded far enough to slip over the wiper ring portion into the slot.

From the foregoing it can be seen that there has been described a shaft wiper 40 that will cooperate with a moveable quill 22 when mounted on a housing 20, for stripping away any particles that might become lodged between the housing and the quill. By stripping such particles away, it is clear that the quill 22 will not become lodged in the housing 20 as a result of any undesired particles invading the spacing between the housing and the quill.

FIG. 8 illustrates a type of shaft wiper 40 that is not completely unitary in construction, but is split to provide for opening so that it can be mounted around a shaft that is either obstructed at both ends, or that may have a type of construction that makes it difficult to slide a shaft wiper over the shaft to its mounting position on surface 36. Machines of this type are readily apparent, with one example being the shafts on an injection molding machine. Another example would be a machine, such as a milling machine, having the milling heads mounted to the end of shaft 22. In order to install or replace a shaft wiper 40, it would be most advantageous to be able to merely open the ring, insert it around the shaft, and hold it in place as by spring 48. To accomplish this, the shaft wiper 40 is hinged at 80 such that the member 42-1 can move as illustrated by arrow 82. In order to register the two halves in proper alignment, member 42-2 is provided with a hole 84 for receiving the projection 86 that is formed on member 42-1. When the projection 86 is mounted in hole 84, the mating ends 88 and 90 of members 42-2 and 42-1 respectively, will be in contact. When thus arranged around the associated shaft 22, a retaining spring 48 can be mounted as shown in FIG. 3 and the shaft wiper 40 will be held in place. Of course mounting screws 44 mounted through mounting holes 50 will hold the entire shaft wiper 40 in place on the housing 20.

It should be understood, that it is not necessary to have the hinged mounting 80, but that both members 42-1 and 42-2 can be accommodated with the hole 84 and the projection 86. For such a configuration, the shaft wiper 40 would be comprised of two separable halves, each of which is symmetrical with respect to the other. Such an arrangement would permit a single mold to provide both of the halves.

Turning now to a consideration of FIG. 9, there is shown an alternative means for holding the ends of the halves of the shaft wiper in proper alignment. In this configuration, the hole 84' is provided with an enlarged portion 84'-1. The projection 86' is provided with the enlarged portion at the end narrowing down to the smaller neck portion 86'-1. When the projection 86' is inserted in the hole 84', there is a temporary spreading of the material at the opening of hole 84' which then pulls back to firmly engage the neck portion 86'-1 when in the fully inserted position. There is enough resiliency in the plastic material to permit such temporary spreading while allowing it to return to its original shape when the projection 86' is fully inserted. An arrangement of this type can be utilized at each of the ends of the halves illustrated in FIG. 8.

FIG. 10 illustrates another embodiment of the shaft wiper 40 of this invention. For this configuration, the primary difference is that the inside diameter ID', is designed to be of a substantially interference fit with the moveable shaft 22. That is, the dimension ID' is equal to or just slightly less than the outside diameter of the shaft 22. Since the shaft wiper 40 is molded from a plastic material, there is sufficient resiliency of the material to allow it to be stretched enough to fit over the surface of shaft 22 and still provide the slideable engagement therewith. As mentioned above, it is most common for shaft 22 to have a lubricant on the surface thereof which will assist in the sliding action.

FIG. 11 is a view taken along line 11—11 in FIG. 10 and illustrates the configuration of the wiper ring portion 46''. It can be seen from this configuration, that there is no need for the spring retaining trough 56, since the interference fit will cause the wiper ring portion 46'' to remain in a wiping contact relationship with the shaft 22 without the need of the spring biasing means. It can be seen that such an arrangement provides an economy over that described above, in that there is no need for the biasing spring. There is, however, the fact that the substantial interference fit will result in a slightly higher degree of wear on the shaft wiper 40 than would be experienced with the type described above.

FIG. 12 illustrates yet another embodiment of this invention wherein the shaft wiper 40 has an inside diameter ID' having a substantial intereference fit with the shaft 22. For this configuration however the wiping ring portion 46'' is not continuous, but is comprised of a plurality of fingers 92 that are separated by narrow spaces 94. The fingers are molded at an angle, for instance 30° with respect to a diameter line, and are arranged such that the leading edges cover any inner opening of the wiper that may be formed where the fingers join the mounting flange. The spaces 94 are not large enough to permit any contaminant to pass beneath the surface of the shaft wiper 40, but are sufficient to provide relief around the wiper ring 46''' such that the substantial intereference fit can be readily accommodated. Such an arrangement would be desirable for shaft wipers 40 that are to be used with relatively large shafts 22. This configuration provides advantage over that illustrated in FIG. 10 in that it is easier to install.

FIG. 13 is a cross-sectional view taken along line 13—13 and FIG. 12, and illustrates the arrangement of the mounting of the fingers 92 and the spacing 94. It will again be noticed that the fingers 92 provide a bevelled surface away from the shaft 22 such that any contaminants are directed away from the shaft outwardly in a manner preventing their buildup at the surface.

In all of the foregoing discussions of the various embodiments, the shaft wipers 40 have been described as circular. It should be understood that since the shaft wipers are molded, they can be molded in any shape to accommodate a moneable shaft that can become contaminated and jam. For instance, in tools having square or rectangular moveable shafts, the shaft wiper of this invention could be equally adapted to such a configuration, and would work equally as well as to prevent jamming.

In the manufacture of the shaft wipers 40, it has been found adventageous to mold them from a plastic material. The plastic material provides for an inexpensive molding manufacturing process, and provides a form of self-lubrication that will not unduly abraid or wear on the shaft that it to be wiped. Of course, it should be understood that it is beneficial if some lubricant is present at the sliding surface, but this is not essential in that there is a certain degree of self-lubrication of the plastic material. Further, in those environments where lubrication is totally absent, and the shaft wiper is found to become worn to a point that it is not working properly, the ease of replacement together with the inexpensive cost of the shaft wiper more than offset the cost in down-time of the machine and the maintenance repair cost that would be incident to jamming of the machine of the shaft wiper is not used.

It should be pointed out further that while the shaft wiper 40 will provide a certain amount of scraping, it is not intended primarily to scrape any substance from the moveable shaft that may be firmably adhered thereto.

From the foregoing, it can be seen that the various purposes and objectives of the invention have been achieved. An inexpensive shaft wiper has been disclosed that will cooperate with a mount and moveable shaft, such as found in many power tools, for preventing undesired particles from invading the space between the mount and shaft, and thereby preventing jamming of the machine. Various modifications will become apparent to those skilled in the art without departing from the spirit and scope of this invention. While the preferred embodiments of this invention have been illustrated and described, it will be understood that these are by way of illustration only, and that various changes or modifications may be made within the contemplation of the invention. Therefore, what is intended to be protected by Letters Patent is defined in the appended claims.

What is claimed is:

1. A shaft wiper for use with driven tools having a moveable shaft with a sliding fit in a support housing, said shaft wiper comprising an integrally formed structure having an aperture therethrough forming a continuous inner surface for surrounding the moveable shaft, mounting flange means extending outwardly from the moveable shaft for mounting said structure to the supporting housing, a continuous leading wiping edge for slidably engaging the moveable shaft for stripping away contaminants and preventing jamming as said moveable shaft is withdrawn into said supporting housing, a continuous surface extending outwardly away from said wiping edge, at a predetermined angle less than ninety degrees, to a predetermined outer surface, said continuous surface for carrying said contaminants outward away from said leading edge for preventing contaminant buildup adjacent the moveable shaft, a continuous retaining channel means intermediate and parallel to said mounting flange means and said predetermined outer surface, and removeable spring biasing means disposed in said retaining channel means for biasing at least said leading wiping edge into the slidable engagement with the moveable shaft.

2. A shaft wiper as in claim 1 wherein at least said leading edge has a substantial interference fit with said moveable shaft.

3. A shaft wiper for use with driven tools having a moveable shaft with a sliding fit in a supporting housing, said shaft wiper comprising an integrally molded structure having a circular aperture therethrough for surrounding the moveable shaft, a circular mounting flange means extending outwardly from the moveable shaft for mounting said molded structure to the supporting housing, a continuous circular leading wiping edge for slidably engaging the moveable shaft for stripping away contaminants and preventing jamming as said moveable shaft is withdrawn into said supporting housing, a continuous slanted surface intermediate said leading edge and said mounting flange means for carrying said contaminant outward away from said leading edge for preventing build-up adjacent the moveable shaft, said slanted surface arranged at a predetermined angle less than ninety degrees to the moveable shaft, retaining channel means intermediate and parallel to said mounting flange means and said slanted surface, and removable coil spring biasing means for cooperating with said retaining channel means for holding at least said leading edge in slidable contact with the moveable shaft, and said retaining channel positioned for permitting said removeable coil spring biasing means to be removed over said slanted surface.

References Cited

UNITED STATES PATENTS

| | | | |
|---|---|---|---|
| 549,419 | 11/1895 | Wright | 184—24 |
| 1,211,613 | 1/1917 | Moore | 184—25 |
| 2,062,748 | 12/1936 | Golden | 74—608 |
| 2,699,843 | 1/1955 | Peters | 184—24 |
| 1,497,125 | 6/1924 | Sorrells | 15—210.2 |
| 1,822,521 | 9/1931 | Fox et al. | 15—256.5 |
| 2,162,104 | 6/1939 | Mosher | 15—210.2 |
| 2,290,507 | 7/1942 | Thompson | 15—210.2 |
| 2,476,324 | 7/1949 | Reich | 15—210.2 |
| 2,729,481 | 1/1956 | Chambers, Jr., et al. | 277—153 |
| 2,850,754 | 9/1958 | Davis | 15—210.2 |
| 3,422,483 | 1/1969 | Craycraft | 15—210.2 |

WALTER A. SCHEEL, Primary Examiner

L. G. MACHLIN, Assistant Examiner

U.S. Cl. X.R.

308—3.5; 184—24

UNITED STATES PATENT OFFICE
CERTIFICATE OF CORRECTION

Patent No. 3,570,037            Dated March 16, 1971

Inventor(s)     Robert M. Rood

It is certified that error appears in the above-identified paten and that said Letters Patent are hereby corrected as shown below:

Column 5, line 44, "46″" should read -- 46‴ --; line 69, "moneable" should read -- moveable --. Column 6, 1 5, "it" should read -- is --.

Signed and sealed this 17th day of August 1971.

(SEAL)
Attest:

EDWARD M. FLETCHER, JR.          WILLIAM E. SCHUYLER,
Attesting Officer                 Commissioner of Pater